(12) United States Patent
Lambertin et al.

(10) Patent No.: US 10,322,966 B2
(45) Date of Patent: Jun. 18, 2019

(54) METHOD FOR PRODUCING A MACROPOROUS AND MESOPOROUS GEOPOLYMER, WITH CONTROLLED POROSITY

(71) Applicant: COMMISSARIAT A L'ENERGIE ATOMIQUE ET AUX ENERGIES ALTERNATIVES, Paris (FR)

(72) Inventors: David Lambertin, Caderousse (FR); Arnaud Poulesquen, Les Angles (FR); Fabien Frizon, Villeneuve lez Avignon (FR); Adrien Rooses, Bagnols sur Ceze (FR); Frederic Goettmann, Courthezon (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 249 days.

(21) Appl. No.: 15/129,037

(22) PCT Filed: Mar. 27, 2015

(86) PCT No.: PCT/EP2015/056712
§ 371 (c)(1),
(2) Date: Sep. 26, 2016

(87) PCT Pub. No.: WO2015/144882
PCT Pub. Date: Oct. 1, 2015

(65) Prior Publication Data
US 2018/0215663 A1 Aug. 2, 2018

(30) Foreign Application Priority Data
Mar. 27, 2014 (FR) ...................... 14 52633

(51) Int. Cl.
C04B 12/00 (2006.01)
C04B 22/06 (2006.01)
C04B 28/00 (2006.01)
C04B 38/06 (2006.01)

(52) U.S. Cl.
CPC .......... *C04B 12/005* (2013.01); *C04B 28/006* (2013.01); *C04B 38/0645* (2013.01); *Y02P 40/165* (2015.11)

(58) Field of Classification Search
CPC .. C04B 12/005; C04B 28/006; C04B 38/0645
See application file for complete search history.

(56) References Cited

U.S. PATENT DOCUMENTS

| | | | |
|---|---|---|---|
| 5,919,427 A | 7/1999 | Harada et al. | |
| 2010/0222204 A1 | 9/2010 | Frizon et al. | |
| 2012/0048147 A1 | 3/2012 | Gehrig et al. | |
| 2013/0055924 A1 | 3/2013 | Seo et al. | |
| 2014/0342156 A1 | 11/2014 | Seo et al. | |
| 2015/0232387 A1* | 8/2015 | Lambertin | C04B 28/006 106/807 |

FOREIGN PATENT DOCUMENTS

| | | |
|---|---|---|
| EP | 0 692 452 A1 | 1/1996 |
| FR | 2 922 543 A1 | 4/2009 |
| WO | WO 2010/121886 A1 | 10/2010 |
| WO | WO 2011/068830 A2 | 6/2011 |
| WO | WO 2011/106815 A1 | 9/2011 |
| WO | WO 2011/110965 A1 | 9/2011 |
| WO | WO 2013/044016 A2 | 3/2013 |

OTHER PUBLICATIONS

U.S. Appl. No. 13/638,479, filed Oct. 2, 2012, US 2013/0014670 A1, David Lambertin, et al.
U.S. Appl. No. 14/774,650, filed Sep. 10, 2015, US 2016/0019992 A1, Celine Cau Dit Coumes, et al.
U.S. Appl. No. 13/574,225, filed Oct. 8, 2012, US 2013/0023713 A1, Virginie Labe, et al.
U.S. Appl. No. 14/647,782, filed May 27, 2015, US 2015/0307393 A1, Marie Guillot, et al.
U.S. Appl. No. 14/769,846, filed Aug. 24, 2015, US 2016/0016150 A1, Sabah El Mourabit, et al.
U.S. Appl. No. 14/780,632, filed Sep. 28, 2015, US 2016/0057993 A1, Amélie Ludwig, et al.
U.S. Appl. No. 14/780,756, filed Sep. 28, 2015, US 2016/0050911 A1, Amélie Ludwig, et al.
U.S. Appl. No. 15/101,840, filed Jun. 3, 2016, Amélie Ludwig, et al.
International Search Report dated Aug. 10, 2015 in PCT/EP2015/056712 (with English translation).
Preliminary French Search Report dated Jan. 30, 2015 in FR 1452633.
Sindhunata J. S. J. Van Deventer, et al., "Effect of Curing Temperature and Silicate Concentration on Fly-Ash-Based Geopolymerisation" Industrial & Engineering Chemistry Research, vol. 45, No. 10, XP002482729, Jan. 1, 2006, pp. 3559-3568.
Calvin Calmon, "Explosion Hazards of Using Nitric Acid in Ion-Exchange Equipment" Chemical Engineering, vol. 87, 1980, pp. 271-274.
K.K.S. Pillay, "A Review of the Radiation Stability of Ion Exchange Materials" Journal of Radioanalytical and Nuclear Chemistry, vol. 102, No. 1, 1986, pp. 247-268.
E. Prud'homme, et al., "In Situ Inorganic Foams Prepared From Various Clays at Low Temperature" Applied Clay Science, vol. 51, 2011, pp. 15-22.
Valentina Medri, et al., "Effect of Metallic Si Addition on Polymerization Degree of In Situ Foamed Alkali-Aluminosilicates", Ceramics International, vol. 39, 2013, pp. 7657-7668.
William D. A. Rickard, et al., "Performance of Solid and Cellular Structured Fly Ash Geopolymers Exposed to a Simulated Fire" Cement and Concrete Composites, vol. 48, 2014, pp. 75-82.
Marcelo Strozi Cilia, et al., "Geopolymer Foams by Gelcasting" Ceramics International, vol. 40, 2014, pp. 5723-5730.

\* cited by examiner

*Primary Examiner* — Anthony J Green
(74) *Attorney, Agent, or Firm* — Oblon, McClelland, Maier & Neustadt, L.L.P.

(57) ABSTRACT

The present invention relates to a method for preparing a macroporous and mesoporous geopolymer and especially a geopolymer foam, comprising the following successive steps (1) preparing a composite material comprising a geopolymer matrix and an organic liquid; then (2) eliminating said organic liquid by a treatment selected from the group consisting of heat treatment, oxidation treatment, photodegradation treatment and extraction using a supercritical fluid or ultrasounds.

23 Claims, 2 Drawing Sheets

METHOD FOR PRODUCING A MACROPOROUS AND MESOPOROUS GEOPOLYMER, WITH CONTROLLED POROSITY

TECHNICAL FIELD

The present invention belongs to the field of porous geopolymers useful for many applications such as catalysis, decontamination, liquid-solid extraction, chemical detection, thermal insulators and construction materials.

More particularly, the present invention proposes a method making it possible to a geopolymer and notably a geopolymer having a controlled macroporous porosity and mesoporous porosity thereby using an organic liquid as a matrix or template.

STATE OF THE PRIOR ART

Liquid-solid extraction is based on the same principle as the liquid-liquid extraction except that the molecules which capture the solutes are grafted or adsorbed on a solid phase. The main solid supports presently used are ion exchange resins and inorganic supports such as silicas, alumina, titanium oxide or zirconium oxide.

Both of these types of support are very widely used on an industrial scale, but have a few drawbacks.

Indeed, ion exchange resins have reactivity (explosion) problems when they are used in the presence of nitric acid [1]. Moreover, when they are used for trapping radioactive elements, they may degrade rapidly under the effect of radiolysis [2]. Finally for a use in a fluidized bed, their low density poses a problem.

Also, inorganic supports as a powder often have too small grain sizes for being able to be applied in a column separation method notably because of a too large pressure drop. Further, such supports have certainly large exchange surface areas but sometimes not very accessible.

These problems may be greatly improved if the material used had bimodal porosity, i.e. macroporosity ensuring satisfactory load transfer and supported mesoporosity at the surface of the macroporosity ensuring the access to a large specific surface area and therefore a sufficient load level of extracting molecules.

Within the scope of the development of inorganic porous materials not only for filtration applications but also for catalysis, thermal insulator and absorbent applications, geopolymer foams are widely studied.

The principle for preparing a geopolymer foam is based on the incorporation of silica fume containing metal silicon or metal aluminum into the fresh geopolymer causing the evolvement of hydrogen gas and the formation of a porous lattice [3-5]. The influence of the amount of water and of silica has been studied and materials having total porosities from 34 to 37% and pores from 0.03 to 98 µm have been produced [4].

Studies have been recently carried out in order to improve the porous lattice formed by the production of hydrogen, by incorporating therein surfactants with mechanical stirring allowing incorporation of air and stabilization of the gases in the fresh geopolymer [6]. It was shown that the increase in the amount of surfactants made it possible to increase the porosity of the material. Materials with 80% of total porosity and 60% of open porosity having pore sizes from 200 to 500 µm have been obtained by this method [6].

However, none of these syntheses makes it possible L to obtain a geopolymer having a controlled macroporous porosity and mesoporous porosity. Therefore the inventors set their goal of proposing a method giving the possibility of preparing a macroporous and mesoporous geopolymer, the porosity of which may be controlled, easy to apply and economical for industrial application as to the preparation of a useful material notably for liquid-solid extraction.

DISCUSSION OF THE INVENTION

The present invention gives the possibility of solving the technical problems and drawbacks listed earlier of the materials and the methods of the prior art. Indeed, the inventors have developed a procedure making it possible to prepare a geopolymer having a macroporous porosity and mesoporous porosity with a reasonable number of steps and a reasonable cost giving the possibility of contemplating industrial application for such a method.

The present invention consists in producing a porous geopolymer material and notably of foam type geopolymer from the immobilization of an organic liquid in a geopolymer material followed by a treatment capable of releasing the porosity of the geopolymer material.

Indeed, the inventors have shown that the very basic pH of the activation solution in which is optionally added an alumino-silicate source can not only give the possibility of maintaining a single phase with the organic phase (i.e. the organic liquid), but also obtaining a block of uniform geopolymer, optionally after adding an alumino-silicate source and once the geopolymerization process has been completed.

The present invention therefore consists in direct immobilization of an organic liquid in a geopolymer material in which the obtained material does not have any structural defect and in which no leaching phenomenon exists. It should be noted that, in the present invention, the organic liquid changes state when it passes from a liquid state to a solid state of the geopolymer type in which the organic liquid is encapsulated or even micro-encapsulated.

On the other hand, the material of the geopolymer matrix type into which is incorporated the organic liquid is easy to prepare and, on the other hand, the step consisting of removing the organic liquid from this material is also easy to apply. Thus, the mesoporous and macroporous geopolymer is therefore easy to prepare, easy to handle and ready for use.

Thus, the present invention relates to a method for preparing a macroporous and mesoporous geopolymer comprising the successive steps consisting of:

1) preparing a composite material comprising a geopolymer matrix and an organic liquid; and then
2) removing said organic liquid by a treatment selected from the group consisting of heat treatment, oxidation treatment, photodegradation treatment and an extraction via a supercritical fluid or ultrasounds.

More particularly, the present invention relates to a method for preparing a macroporous and mesoporous geopolymer comprising the successive steps consisting of:

1) preparing a composite material comprising a geopolymer matrix and an organic liquid; and then
2) removing said organic liquid by a treatment selected from the group consisting of heat treatment, oxidation treatment, photodegradation treatment and extraction via a supercritical fluid or ultrasounds, said step (1) comprises the following sub steps:

a) preparing an activation solution comprising said organic liquid, b) adding to the solution obtained in step (a) at least one alumina-silicate source, c) subjecting the mixture obtained in step (b) to conditions allowing hardening of the geopolymer.

The material prepared during step (1) is a composite material. By «composite material», is meant, within the scope of the present invention, an assembly of a geopolymer matrix and of an organic liquid. This assembly may appear as an encapsulation of the organic liquid by the geopolymer matrix, of a microencapsulation of the organic liquid by the geopolymer matrix and/or a coating of the organic liquid with the geopolymer matrix.

More particularly, the composite material prepared within the scope of the invention appears as a geopolymer (or geopolymer matrix) in which organic liquid beads and notably microbeads and/or nanobeads of organic liquid are coated. By «microbead», is meant an organic liquid droplet for which the average diameter is comprised between 1 and 1,000 μm, notably between 5 and 900 μm and in particular between 20 and 800 km. By «nanobead», is meant an organic liquid droplet for which the average diameter is comprised between 1 and 1,000 nm, notably between 10 and 900 nm and in particular between 20 and 800 nm. The organic liquid microbeads and nanobeads present in the composite material according to the invention may have various shapes such as oval, spheroid or polyhedral shape. These nanobeads and microbeads are the ones which essentially participate in the macroporous nature of the final geopolymer, i.e. obtained after step (2) of the method according to the invention in fact giving pores with various shapes such as oval, spheroid or polyhedral shapes.

Advantageously, the composite material prepared during step (1) of the method according to the present invention only contains the microbeads and/or nanobeads of organic liquid and a geopolymer matrix.

By «organic liquid», is meant, within the scope of the present invention, a liquid comprising a compound and/or a solvent, said compound and said solvent having at least one carbon atom and notably at least two carbon atoms.

Advantageously, the organic liquid applied within the scope of the present invention is a non-miscible liquid in water or completely soluble in water at a concentration of less than or equal to 2% by weight and this at 25° C. and at atmospheric pressure.

Still advantageously, the organic liquid applied within the scope of the present invention comprises at most 50%, notably at most 40%, in particular at most 30%, more particularly, at most 20% and, most particularly, at most 10% of triglycerides by mass based on the total dry mass of said organic liquid. In a particular alternative, the organic liquid does not comprise any triglyceride. By «triglyceride», is meant a compound of formula $H_2C(OR^1)$—$C(H)(OR^2)$—$C(OR^3)H_2$, with $R^1$, $R^2$ and $R^3$ either identical or different, representing a group of formula —$C(=O)R$ with R representing a carbonaceous group. This carbonaceous group is notably a linear, cyclic or branched alkyl group; either saturated or unsaturated; with 1 to 40 carbon atoms, advantageously from 2 to 30 carbon atoms; optionally substituted and optionally comprising at least one heteroatom selected from the group formed by of N, O, F, Cl, P, Si, Br and S.

In particular, the organic liquid applied within the scope of the present invention is an unsaponifiable organic liquid. By «unsaponifiable organic liquid», is meant an organic liquid not having any ester function group which may be hydrolyzed under basic conditions. In this embodiment, the organic liquid does not comprise any triglyceride, any phospholipid and any glycolipid.

Thus, an organic liquid applied within the scope of the present invention may be a degreasing agent or an oil. By «degreasing agent», is meant a liquid capable of removing a residue present at the surface of a support by coming into contact with the support. By «oil» is meant a liquid non-miscible with water or completely soluble in water at a concentration less than or equal to 2% by weight and this at 25° C. and at atmospheric pressure. Such an oil is notably a mineral or synthetic oil. Advantageously, the organic liquid applied within the scope of the present invention is or comprises a thermally insulating oil. By «thermally insulating oil», is meant an oil for which the heat conductivity is between 0.1 and 0.2 W/(m·K) and notably between 0.1 and 0.17 W/(m·K).

In particular, the organic liquid applied within the scope of the present invention is or comprises at least one element selected from the group consisting of a naphthenic oil; an aliphatic hydrocarbon; an unsaturated linear synthetic hydrocarbon; an aromatic hydrocarbon such as a synthetic aromatic hydrocarbon; a chlorinated linear hydrocarbon; a chlorinated aromatic hydrocarbon; a chlorinated-fluorinated linear hydrocarbon; an ethylenic aromatic hydrocarbon; a chlorinated solvent; an oxygenated solvent such as an alcohol, a ketone, a glycol ether and an ether oxide; an alkyl phosphate; an alkyl chloride and a liquid silicone.

More particularly, the organic liquid applied within the scope of the present invention is or comprises at least one element selected from the group consisting of commercial scintillator liquid, motor oil, oil for transformers, benzene, alkyl benzene, alkyl naphthalene, alkyl biphenyl, toluene, xylene, ethyl benzene, kerosene, hexane, cyclohexane, octane, ethylcyclohexane, dodecane, eicosane, phenol, dichloromethane, trichloroethane, dichlorobenzene, trichlorethylene, perchlorethylene, trichlorobenzene, polychlorinated biphenyl, trichloro-trifluoroethane, alkyldiarylethylene, 2-octanone, 4-dodecanone, tributyl phosphate (TBP), tetrahydrofuran (THF), diethyl ether, polydimethylsiloxane and polydiphenylsiloxane.

The organic liquid applied within the scope of the present invention may appear as a solution, an emulsion, a microemulsion, a suspension or a colloidal suspension.

By «geopolymer» or «geopolymer matrix», is meant within the scope of the present invention, a solid material, porous in the dry condition, obtained subsequently to the hardening of a mixture containing finely milled materials (i.e. the alumino-silicate source) and a saline solution (i.e. the activation solution), said mixture being capable of setting and hardening over time. This mixture may also be referred to with the terms of «geopolymeric mixture» or «geopolymeric composition». The hardening of the geopolymer is the result of dissolution/polycondensation of the finely milled materials of the geopolymeric mixture in a saline solution such as a saline solution of strong pH (i.e. the activation solution).

More particularly, a geopolymer or geopolymer matrix is an amorphous alumino-silicate inorganic polymer. Said polymer is obtained from a reactive material essentially containing silica and aluminum (i.e. the alumino-silicate source), activated by a strongly alkaline solution, the mass ratio solid/solution in the formulation being low. The structure of a geopolymer consists of an Si—O—Al lattice formed with silicate tetrahedra ($SiO_4$) and of aluminates ($AlO_4$) bound at their apices by sharing oxygen atoms. Within this lattice, are found one or several cations compensating charges also called compensation cations which give the possibility of compensating the negative charge of the $AlO_4$ complex. Said compensation cation(s) is(are)

advantageously selected from the group consisting of alkaline metals such as lithium (Li), sodium (Na), potassium (K), rubidium (Rb) and cesium (Cs), earth alkaline metals such as magnesium (Mg), calcium (Ca), strontium (Sr) and barium (Ba) and mixtures thereof.

The expressions of «reactive material essentially containing silica and aluminum» and «alumino-silicate source» are, in the present invention, similar and may be used interchangeably.

The reactive material essentially containing silica and aluminum which may be for preparing the geopolymer matrix applied within the scope of the invention is advantageously a solid source containing amorphous alumino-silicate. These amorphous alumino-silicates are notably selected from minerals of natural alumino-silicates such as illite, stilbite, kaolinite, pyrophyllite, andalusite, bentonite, kyanite, milanite, grovenite, amesite, cordierite, feldspar, allophane, etc.; calcined natural alumino-silicate minerals such as metakaolin; synthetic glasses based on pure alumino-silicates; aluminous cement; pumice; calcined sub-products or industrial utilization residues such as flying ashes, and blast furnace slags respectively obtained from combustion of coal and during the transformation of the iron ore into cast iron in a blast furnace; and mixtures thereof.

The saline solution with a strong pH also known, in the field of geopolymerization, as «activation solution» is a strongly alkaline aqueous solution which may optionally contain silicate components notably selected from the group consisting of silica, colloidal silica and glassy silica.

The expressions of «activation solution», «saline solution with a strong pH» and «strongly alkaline solution» are, in the present invention, similar and may be used interchangeably.

By «strongly alkaline» or «of a strong pH», is meant a solution for which the pH is greater than 9, notably greater than 10, in particular greater than 11 and more particularly greater than 12. In other words, the activation solution has an $OH^-$ concentration of more than 0.01M, notably greater than 0.1M, in particularly greater than 1M and more particularly, comprising 5 and 20M.

The activation solution comprises the compensation cation or the mixture of compensation cations as an ionic solution or a salt. Thus, the activation solution is notably selected from an aqueous solution of sodium silicate ($Na_2SiO_3$), potassium silicate ($K_2SiO_2$), sodium hydroxide (NaOH), potassium hydroxide (KOH), calcium hydroxide ($Ca(OH)_2$), cesium hydroxide (CsOH) and derivatives thereof etc. . . . .

In a first embodiment, the step (1) of the method according to the present invention comprises the following sub-steps:

a) preparing an activation solution comprising said organic liquid, b) adding to the solution obtained in step (a) at least one alumino-silicate source, c) subjecting the mixture obtained in step (b) to conditions allowing hardening of the geopolymer.

This application embodiment is remarkable since it gives the possibility of controlling the final porosity of the obtained geopolymer and this, as soon as sub step (a).

The sub-step (a) of the method according to the present invention consists of adding to a prepared beforehand activation solution, as defined earlier, the organic liquid. The prior preparation of the activation solution is a standard step in the field of geopolymers.

As explained earlier, the activation solution may optionally contain one or several silicate components notably selected from the group consisting of silica, colloidal silica and glassy silica. When the activation solution contains one or several silicate components, the latter is(are) present in an amount comprised between 100 mM and 10M, notably between 500 mM and 8M and in particular between 1 and 6M in the activation solution.

The organic liquid is added to the activation solution at one go or in batches or even dropwise. Once the organic liquid is added to the activation solution, the obtained solution is mixed by using a kneader, a stirrer, a magnetic bar, an ultrasonic bath, or a homogenizer. The mixing/blending during the sub-step (a) of the method according to the invention is ensured at a relatively sustained rate. By «relatively sustained rate», is meant, within the scope of the present invention, a rate of more than 250 rpm, notably greater than or equal to 350 rpm. Such stirring gives the possibility of obtaining a uniform solution, notably a homogeneous solution or a solution of the microemulsion type.

The sub-step (a) of the method according to the invention is carried out at a temperature comprised between 10° C. and 40° C., advantageously between 15° C. and 30° C. and more particularly at room temperature (i.e. 23° C.±5° C.) for a period of more than 6 hours, notably more than 10 hours, in particular comprised between 10 hours and 48 hours and more particularly between 12 hours and 36 hours.

It should be noted that it may be necessary, during the sub-step (a), to use at least one surfactant, i.e. a molecule including a lipophilic (apolar) portion and hydrophilic (polar) portion and this in order to obtain a uniform solution subsequently to the sub-step (a) of the method according to the invention. In other words, one or several surfactants may have to be added in order to increase the miscibility or the dispersion of the organic liquid in the activation solution.

The surfactant(s) may be added (α) to the activation solution before adding the organic liquid (β) to the organic liquid prior to its addition into the activation solution or (γ) to the activation solution into which the organic liquid has already been added. The embodiment (β) is advantageous since by adding the surfactant+organic liquid mixture, it is possible to further control the size of the nanobeads and/or of the microbeads of organic liquid, i.e. the size of the surfactant micelles filled with organic liquid, and therefore the porosity of the obtained geopolymer.

Among the surfactants which may be used within the scope of the present invention, mention may be made of:

i) anionic surfactants, the hydrophilic portion of which is negatively charged such as alkyl or aryl sulfonates, sulfates, phosphates, or sulphosuccinates associated with a counter-ion such as an ammonium ion ($NH^{4+}$), a quaternary ammonium such as tetrabutyl ammonium and the alkaline cations such as $Na^+$, $Li^+$ and $K^+$. As anionic surfactants, for example it is possible to use tetraethylammonium para-toluenesulphonate, sodium dodecylsulfate, sodium palmitate, sodium stearate, sodium myristate, sodium di(2-ethylhexyl) sulfosuccinate, methylbenzenesulfonate and ethylbenzenesulfonate.

ii) cationic surfactants, the hydrophilic portion of which is positively charged, are notably selected from among quaternary ammoniums including at least one aliphatic chain $C_4$-$C_{22}$ associated with an anionic counter-ion notably selected from among boron derivatives such as tetrafluoroborate or halide ions such as $F^-$, $Br^-$, $I^-$ or $Cl^-$. As cationic surfactants, for example it is possible to use tetrabutylammonium chloride, tetradecylammonium chloride, tetradecyltrimethyl ammonium bromide (TTAB), alkyl pyridinium halides bearing an aliphatic chain and alkylammonium halides.

iii) zwitterionic surfactants which are neutral compounds having formal electrical charges of one unit and of opposite sign, notably selected from among the compounds having an alkyl $C_5$-$C_{20}$ chain generally substituted with a negatively charged function such as a sulfate or a carboxylate, and a positively charged function like an ammonium. As zwitterionic surfactants, mention may be made of sodium N,N-dimethyldodecylammonium butanate, sodium dimethyldodecylammonium propanate and amino acids.

iv) amphoteric surfactants which are compounds behaving both as an acid or a base depending on the medium in which they are placed. As amphoteric surfactants, it is possible to use disodium lauroamphodiacetate, betaines like alkylamidopropylbetaine or laurylhydroxysulfobetaine.

v) neutral (non-ionic) surfactants, the surface-active properties, notably hydrophilicity of which are provided by non-charged functional groups such as an alcohol, an ether, an ester or further an amide, containing heteroatoms such as nitrogen or oxygen; because of the low hydrophilic contribution of these functions, non-ionic surfactant compounds are most often polyfunctional. As non-ionic surfactants, it is possible to use polyethers like polyethoxylated surfactants such as for example polyethylene glycol lauryl ether (POE23 or Brij® 35), polyols (surfactants derived from sugars) in particular glucose alkylates such as for example glucose hexanate.

The amount of surfactant(s) used within the scope of the present invention will considerably depend on the organic liquid and on the activation solution used in the method. One skilled in the art will be able to determine the adequate amount by means of routine tests. As an example, in the activation solution containing the organic liquid, the surfactant is present in a proportion comprised between 0.1 and 20%, notably between 0.5 and 15% and in particular between 1 and 10% by volume based on the total volume of said solution.

The sub-step (b) of the method according to the invention consists of putting into contact the activation solution comprising the organic liquid and optionally a surfactant and the alumino-silicate source as defined earlier.

The alumino-silicate source may be poured, in one or several times, onto the activation solution containing the organic liquid and optionally a surfactant. In a particular embodiment of sub-step (b), the alumino-silicate source may be sprinkled onto the activation solution containing the organic liquid and optionally a surfactant.

Advantageously, the sub-step (b) of the method according to the invention is applied in a kneader in which the activation solution containing the organic liquid and optionally a surfactant was introduced beforehand. Any kneader known to one skilled in the art may be used within the scope of the present invention. As non-limiting examples, mention may be made of a mixer NAUTA®, a kneader HOBART® and a kneader HENSCHEL®.

The sub-step (b) of the method according to the invention therefore comprises mixing or kneading of the activation solution containing the organic liquid and optionally a surfactant with the alumino-silicate source. The mixing/kneading during the sub-step (b) of the method according to the invention is ensured at a relatively low rate. By «relatively slow rate», is meant within the scope of the present invention, a speed of rotation of the rotor of the kneader of less than or equal to 250 rpm, notably greater than or equal to 50 rpm and, in particular comprised between 100 and 250 rpm. As a non-limiting example, in the case of a standardized kneader, the stirring rate is 200 rpm.

The sub-step (b) of the method according to the invention is carried out at a temperature comprised between 10° C. and 40° C., advantageously between 15° C. and 30° C. and, more particularly, at room temperature (i.e. 23° C.±5° C.) for a period of more than 2 min, notably comprised between 4 min and 1 h and in particular comprised between 5 min and 30 min.

One skilled in the art will be able to determine the amount of alumino-silicate source to be used within the scope of the present invention according to his/her knowledge in the field of geopolymerization as well as to the nature of the applied organic liquid and to the amount of organic liquid and to the activation solution applied.

Advantageously, in the method according to the present invention, the activation solution/MK mass ratio with the activation solution representing the mass of the activation solution containing the organic liquid and optionally a surfactant (expressed in g) and MK representing the mass of alumino-silicate source (expressed in g) used is advantageously comprised between 0.6 and 2 and notably between 1 and 1.5. As a particular example, the activation solution/MK ratio is of the order of 1.28 (i.e. 1.28±0.1). An activation solution/MK ratio comprised between 1.2 and 1.4 gives the possibility of guaranteeing an amount and a size of the pores in the geopolymer favorable for encapsulation and notably for micro-encapsulation of organic liquid.

Further, in addition to the alumino-silicate source, sand, a granulate and/or fines may be added to the activation solution during said step (b) of the method according to the invention.

By «granulate», is meant a granular, natural, artificial or recycled material, the average grain size of which is advantageously comprised between 10 and 125 mm.

The fines also called «fillers» or «addition fines» is a dry product, finely divided, stemming from cutting, sawing or working on natural rocks, granulates as defined earlier and ornamental stones. Advantageously, the fines have an average grain size notably comprised between 5 and 200 µm.

The sand, the granulate and the fines are added in order to better regulate the rise in temperature during the sub-step (b) of the method but also for optimizing the physical and mechanical properties of the obtained composite material.

The sand optionally added during the sub-step (b) may be limestone sand or a siliceous sand. Advantageously, this is a siliceous sand which gives the possibility of attaining the best results as regards the optimization of the physical and mechanical properties of the obtained composite material. By «siliceous sand», is meant within the scope of the present invention, a sand consisting of more than 90%, notably more than 95%, in particular more than 98% and, most particularly more than 99% of silica ($SiO_2$). The siliceous sand applied in the present invention advantageously has an average grain size notably less than 10 mm, notably less than 7 mm and in particular, less than 4 mm. As a particular example, it is possible to use a siliceous sand having an average size of the grains comprised between 0.2 and 2 mm.

When sand is added in addition to the alumino-silicate source to the activation solution, the mass ratio between sand and alumino-silicate source is comprised between 2/1 and 1/2, notably between 1.5/1 and 1/1.5 and, in particular, between 1.2/1 and 1/1.2.

Sub-step (c) of the method according to the invention consists of subjecting the obtained mixture to sub-step (b) under conditions allowing hardening of the geopolymeric mixture.

Any technique known to one skilled in the art for hardening a geopolymeric mixture in which is present the organic liquid may be used during the hardening step of the method.

The conditions allowing hardening during the sub-step (c) advantageously comprise a curing step optionally followed by a drying step. The curing step may take place in free air, under water, in diverse hermetically sealed molds, by humidification of the atmosphere surrounding the geopolymeric mixture or by applying an impervious coating onto said mixture. This curing step may be applied under a temperature comprised between 10 and 80° C., notably between 20 and 60° C. and in particular between 30 and 40° C. and may last for between 1 and 40 days, or even longer. It is obvious that the duration of the curing depends on the applied conditions during the latter and one skilled in the art will be able to determine the most adapted duration, once the conditions are defined and optionally by routine tests.

When the hardening step comprises a drying step, in addition to the curing step, this drying may be accomplished at a temperature comprised between 30 and 90° C., notably between 40 and 80° C. and in particular between 50 and 70° C. and may last for between 6 h and 10 days, notably between 12 h and 5 days and, in particular, between 24 and 60 h.

Further, prior to the hardening of the geopolymeric mixture in which the organic liquid is present, the latter may be placed in molds so as to give it a predetermined shape subsequently to this hardening.

In a $2^{nd}$ embodiment, the step (1) of the method according to the present invention comprises the following steps:

a') adding to an activation solution at least one alumino-silicate source, b') adding to the mixture obtained in step (a'), said organic liquid, c') subjecting the mixture obtained in step (b') to conditions allowing hardening of the geopolymer.

The sub-step (a') of the method according to the present invention consists of preparing an activation solution as defined earlier in which is added at least one alumino-silicate source as defined earlier. Such a sub-step is standard in the field of geopolymers.

All which has been described earlier as to the activation solution during sub-step (a) is also applied to the activation solution applied during sub-step (a').

Also, all which has been described earlier for the sub-step (b) and notably the mixing/kneading conditions, the type of kneader, the temperature, the amount of alumino-silicate source and the activation solution/MK mass ratio is applied, mutatis mutandis, to the sub-step (a').

The sub-step (b') of the method consists of introducing into the mixture (activation solution+alumino-silicate source), the organic liquid. It is obvious that this sub-step should be applied relatively rapidly after preparation of the aforementioned mixture and this before any hardening of this mixture which might prevent the obtaining of a homogenous mixture following sub-step (b').

The organic liquid is then added to the mixture (activation solution+alumino-silicate source) in one go or several times or even drop wise. Once the organic liquid has been added to the mixture (activation solution+alumino-silicate source), the obtained preparation is mixed by using a kneader, a stirrer, a magnetic bar, an ultrasonic bath or a homogenizer. The mixing/kneading during the sub-step (b') of the method according to the invention is accomplished at a relatively sustained rate as defined earlier and this, for obtaining a homogeneous mixture following sub-step (b').

The sub-step (b') of the method according to the invention is carried out at a temperature comprised between 10° C. and 40° C., advantageously between 15° C. and 30° C. and, more particularly, at room temperature (i.e. 23° C.±5° C.) for a period of more than 6 h, notably more than 10 h, in particular comprised between 10 h and 48 h and, most particularly between 12 h and 36 h.

As explained earlier, it may be required during the sub-step (b'), to use at least one surfactant as defined earlier and this, in order to obtain a homogeneous mixture following the sub-step (b') of the method according to the invention. In other words, one or several surfactants may have to be added in order to increase the miscibility or the dispersion of the organic liquid in the mixture (activation solution+alumino-silicate source).

The surfactant(s) may be added to the mixture ($\alpha'$) (activation solution+alumino-silicate source), to the organic liquid ($\beta'$) prior to its addition into the mixture (activation solution+alumino-silicate source) or to the mixture ($\gamma'$) (activation solution+alumino-silicate source) in which the organic liquid has already been added. The embodiment ($\beta'$) is preferable towards the sought purpose. All what was indicated for the surfactant within the scope of the sub-step (a) and notably the amount of surfactant also applies to the sub-step (b').

Further, as contemplated within the scope of the $1^{st}$ embodiment, sand, granulate and/or fines as defined earlier may be used for preparing the composite material obtained following step (1) of the method according to the invention. The sand, the granulate and/or the fines may be added during the sub-step (a'); following the sub-step (a') and prior to the sub-step (b'); during the sub-step (b') and/or following the sub-step (b') and prior to the sub-step (c').

Finally, all what has been described for the sub-step (c) also applies to the sub-step (c').

In the composite material obtained following step (1) of the method according to the present invention, the organic liquid is incorporated into the geopolymeric matrix up to an incorporation level of 90% by volume based on the total volume of said composite material, notably up to an incorporation level of 80% by volume based on the total volume of said composite material and typically at an incorporation level comprised between 0.5 and 70% by volume based on the total volume of said composite material. In other words, the organic liquid represents between 0.5 and 70% by volume based on the total volume of the composite material, object of the invention or composite material prepared according to the method object of the invention. Advantageously, this incorporation level is comprised between 1 and 65%, notably between 5 and 60% and, in particular between 10 and 55% by volume based on the total volume of said composite material. As particular examples, this incorporation level may be of the order of 20% (i.e. 20%±5%), of the order of 30% (i.e. 30%±5%), of the order of 40% (i.e. 40%±5%) or of the order of 50% (i.e. 50%±5%) by volume based on the total volume of said composite material.

Step (2) of the method according to the present invention consists of removing the organic liquid and thus releasing the porosity of the composite material obtained following step (1). It is obvious that this removal also causes that of the surfactant(s) optionally used during the preparation of said composite material.

Different alternatives are contemplated as to this removal.

The $1^{st}$ of these alternatives consists in a heat treatment. By «heat treatment», is meant, within the scope of the present invention, the fact of subjecting the composite material of step (1) to a high temperature i.e. a temperature above 200° C., notably comprised between 300° C. and 1,000° C. and in particular, comprised between 400° C. and 800° C.

This heat treatment is advantageously carried out under oxygen, in air, under an inert gas such as argon or under a neutral gas such as nitrogen and advantageously under oxygen or in air. This heat treatment step consists in a calcination or a sublimation of the organic compounds which the organic liquid and the surfactants applied are.

This step has a duration comprised between 15 min and 12 h and notably between 1 h and 6 h. It is possible for one skilled in the art to vary the heat treatment conditions and this, depending on the composite material obtained at the end of step (1) to get a porous geopolymer free of any organic compound.

The $2^{nd}$ of the alternatives contemplated for removing the organic liquid and optionally the surfactants used consists of oxidizing these elements mainly into $CO_2$ and $H_2O$. Such an oxidation treatment is notably either a plasma treatment, or a treatment with ozone.

The plasma treatment consists of exposing the composite material obtained following step (1) to a plasma. As a reminder, plasma is a gas in the ionized state, conventionally considered as a fourth state of matter. The energy required for the ionization of a gas is provided by means of an electromagnetic wave (radiofrequency or microwave). The plasma consists of neutral molecules, ions, electrons, radical species (chemically very active) and excited species which will react with the surface of the materials.

A distinction is made between so called «cold» plasmas and so called «hot» plasmas which are distinguished from each other with respect to the ionization level of the species contained in the plasma. For so-called «cold» plasmas, the ionization level of the reactive species is less than $10^{-4}$, while for so-called «hot» plasmas, it is greater than $10^{-4}$. The terms of «hot» and «cold» come from the fact that the so-called «hot» plasma is much more energetic than the so-called «cold» plasma.

The plasma is advantageously generated by mixing at least two gases, the first and the second gas being respectively selected from the group consisting of inert gases and the group consisting of air and oxygen. The plasma treatment duration is comprised between 1 and 30 min, and notably between 5 and 15 min.

A treatment with ozone consists of exposing the composite material obtained following step (1) to ozone. This exposure may either imply the putting of this composite material in contact with an ozone flow, or the placement of the latter in an atmosphere containing ozone.

The required ozone may be obtained, from an oxygen-rich gas such as air, oxygen, oxygen-enriched air or oxygen-enriched gas, via an ozone generator such as an UVO-Cleaner Model 42-200 with a low pressure mercury vapor lamp (28 mW/cm$^2$, 254 nm). The duration of the ozone treatment may be variable. As non-limiting examples, this duration is advantageously comprised between 30 s and 3 h, notably between 1 min and 1 h, in particular between 5 min and 30 min and more particularly of the order of 10 min (10 min±3 min).

The $3^{rd}$ of the contemplated alternatives for removing the organic liquid and optionally the surfactants used is a photodegradation treatment. The latter consists in degradation of the organic compounds contained in the composite material obtained following step (1) by means of exposure to light radiation and notably to UV light.

Advantageously, the UV light applied has a wavelength comprised between 10 nm and 400 nm, notably between 100 nm and 380 nm and in particular between 180 nm and 360 nm. Any UV source may be used for generating such UV light. As an example, mention may be made of a UV lamp, of a low pressure mercury vapor lamp, a medium pressure mercury vapor lamp, a high pressure mercury vapor lamp, a very high pressure mercury vapor lamp, an electric arc lamp, a lamp with halides, a lamp with xenon, a laser, an excimer ArF laser, an excimer KrF laser, an excimer lamp or synchrotron radiation.

The UV treatment within the scope of the present invention may be achieved at a temperature comprised between 5° C. and 120° C., notably between 10° C. and 80° C. and, in particular, between 15° C. and 40° C. More particularly, the UV treatment according to the invention is carried out at room temperature. The UV treatment within the scope of the present invention lasts for 1 min to 5 h, notably from 5 min to 1 h and, in particular, from 10 min to 45 min. The irradiation may be unique or repeated several times, notably from 2 to 20 times and in particular from 3 to 10 times.

This UV treatment is advantageously carried out in a gas and notably in the presence of oxygen-rich and/or ozone-rich gas such as air, oxygen, ozone, air enriched with oxygen and/or with ozone or a gas enriched with oxygen and/or with ozone.

The last of these alternatives consist in an extraction of the organic compounds which are the organic liquid and the surfactants applied, with a supercritical fluid or with ultrasounds.

In the foregoing and in the following, the expression «supercritical fluid» is used in its usual acceptance, i.e. a «supercritical fluid» is a fluid heated to a temperature above its critical temperature (maximum temperature in liquid phase, regardless of the pressure or temperature of the critical point) and subject to a pressure above its critical pressure (pressure of the critical point), the physical properties of such a supercritical fluid (density, viscosity, diffusivity) being intermediate between those of liquids and those of gases. The step (2) of the method according to the invention makes use of the remarkable solubility properties of the organic compounds which supercritical fluids have.

Any supercritical fluid known to one skilled in the art and generally used in the methods for extraction and solubilization of organic materials may be used within the scope of the present invention. Advantageously, the supercritical fluid used within the scope of step (2) of the method according to the present invention is selected from the group consisting of supercritical carbon dioxide ($CO_2$), supercritical nitrogen monoxide ($N_2O$), supercritical Freon®22 (chlorodifluoromethane), supercritical Freon®23 (trifluoromethane), supercritical methanol, supercritical hexane and supercritical water. More particularly, the supercritical fluid used within the scope of step (2) of the method according to the present invention is supercritical $CO_2$, its critical temperature (31° C.) and its critical pressure (74 bars) being relatively easy to reach.

The treatment with ultrasounds may be achieved on the composite material obtained following step (1) placed with a suitable solvent in an ultrasonic tank/tub or with an ultrasonic probe and this for a duration comprised between 5 min and 24 h and notably between 10 min and 12 h. As an example, an ultrasonic tank/tub or an ultrasonic probe may be used releasing a power comprised between 200 W and 750 W and operating at a frequency comprised between 10 and 45 kHz.

This extraction step carried out both with a supercritical fluid and with ultrasounds has a duration comprised between 15 min and 12 h and notably between 1 h and 6 h. It is possible for one skilled in the art to vary the treatment via a supercritical fluid and this, depending on the composite material obtained at the end of step (1) to get a porous geopolymer without any organic compound.

Once the step (2) of the method according to the invention has been applied, a mesoporous and macroporous geopolymer i.e. a geopolymer having both macropores and mesopores, is obtained. By «macropores», are meant pores or voids having an average diameter greater than 50 nm and notably greater than 70 nm. By «mesopores», are meant pores or voids having an average diameter comprised between 2 and 50 nm and notably between 2 and 20 nm. In this geopolymer, the macropores are essentially derived from nanobeads and/or microbeads of organic liquid, while the mesopores mainly result from the geopolymerization method.

The geopolymer obtained following the method according to the present invention has an open porosity, a penetrating open porosity, a connected porosity and a closed porosity. Further, in certain embodiments, this may be referred to as a geopolymer foam and advantageously for geopolymers having a porosity expressed by volume based on the total volume of the geopolymer, greater than 30%, notably greater than 40% and, in particular, greater than 50%. Such a foam is of interest in the applications in constructions because of the thermal insulation which it provides since it is known that the increase in the porosity level induces a decrease in the heat conductivity.

Other features and advantages of the present invention will further become apparent to one skilled in the art upon reading the examples below given as an illustration and not as a limitation, with reference to the appended figures.

DETAILED DISCUSSION OF PARTICULAR EMBODIMENTS

Geopolymer foams according to the present invention were prepared from the "geopolymer+organic liquid (oil)" composite with 20, 40 and 50% by volume of organic liquid.

The products used for the geopolymer are metakaolin from Pieri Premix MK (Grade Construction Products), NaOH (Prolabo, 98%), sodium silicate Betol 52T (Woellner) and motor oil as an organic liquid (or matrix or template). The compositions are copied into the table hereafter.

TABLE 1

Composition of the mortar for microencapsulation of oil

| Template % (Vol.) | Binder composition (in g) |
|---|---|
| 20 | NaOH: 38.3 |
|  | $H_2O$: 113.6 |

TABLE 1-continued

Composition of the mortar for microencapsulation of oil

| Template % (Vol.) | Binder composition (in g) |
|---|---|
|  | Betol 52 T: 393 |
|  | Metakaolin: 374.7 |
|  | Oil: 87.7 |
| 40 | NaOH: 34.5 |
|  | $H_2O$: 102.2 |
|  | Betol 52 T: 353.7 |
|  | Metakaolin: 377.3 |
|  | Oil: 210.5 |
| 50 | NaOH: 4.8 |
|  | $H_2O$: 14.2 |
|  | Betol 52 T: 49.1 |
|  | Metakaolin: 46.8 |
|  | Oil: 43.3 |

After setting, the «geopolymer+organic liquid (oil)» composites are put into an oven at 400° C., for 2 h, in air, in order to release the porosity of the composite.

Figure 1:
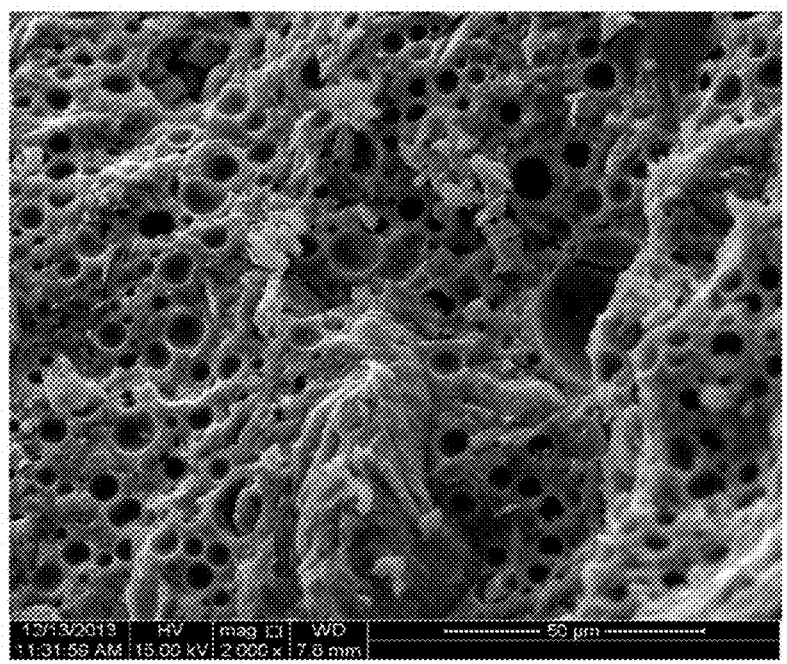
FIG. 1 is a scanning electron microscopy view of a geopolymer foam with 20% of organic liquid according to the present invention.
Figure 2:
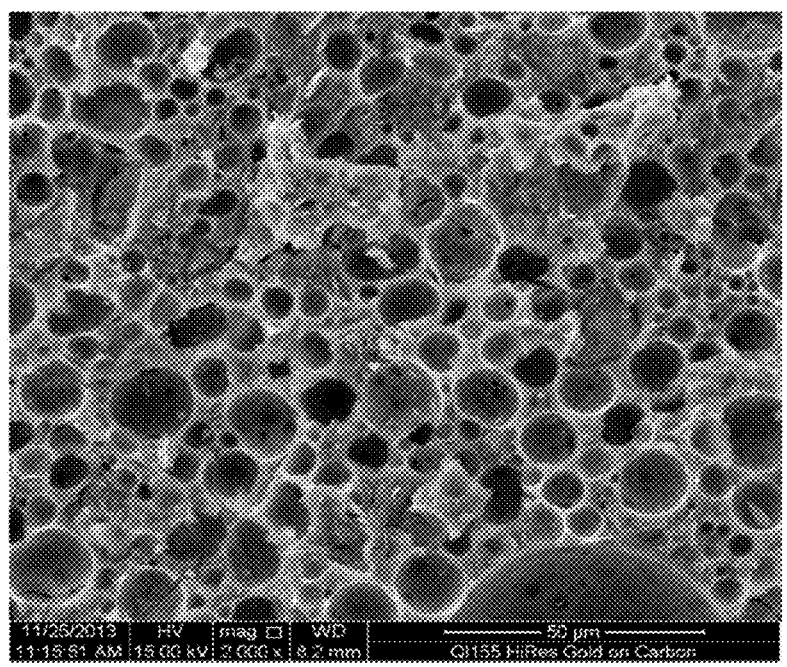
FIG. 2 is a scanning electron microscopy view of a geopolymer foam with 40% of organic liquid according to the present invention.
Figure 3:
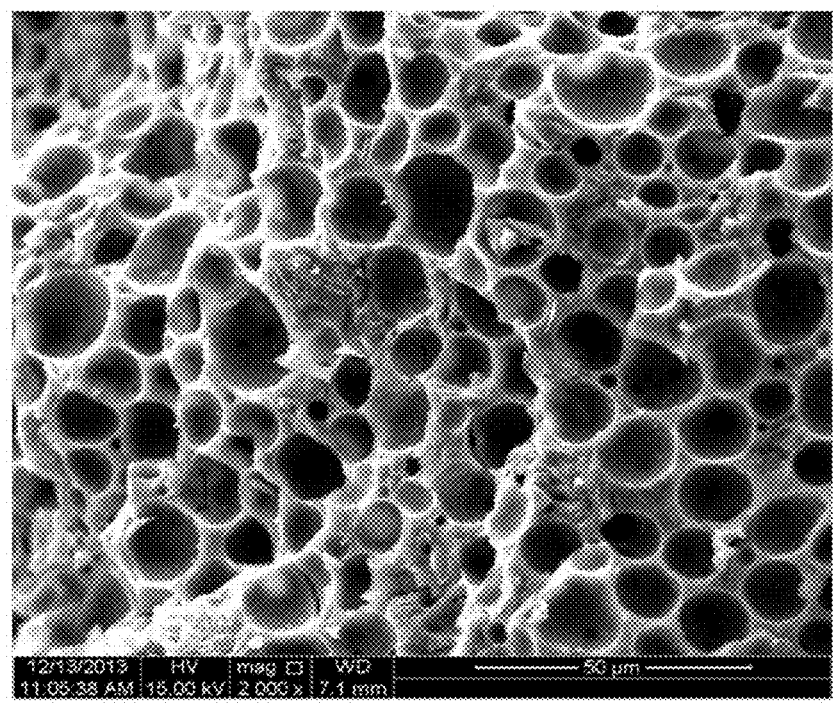
FIG. 3 is a scanning electron microscopy view of a geopolymer foam with 50% of organic liquid according to the present invention.

In FIGS. 1, 2 and 3, are copied the SEM photographs of geopolymer foams after heat treatment at 400° C., a porous network clearly appears increasingly dense with increase in the load of template in the geopolymer. The macropores have a size of the order of 10 m.

Figure 4:
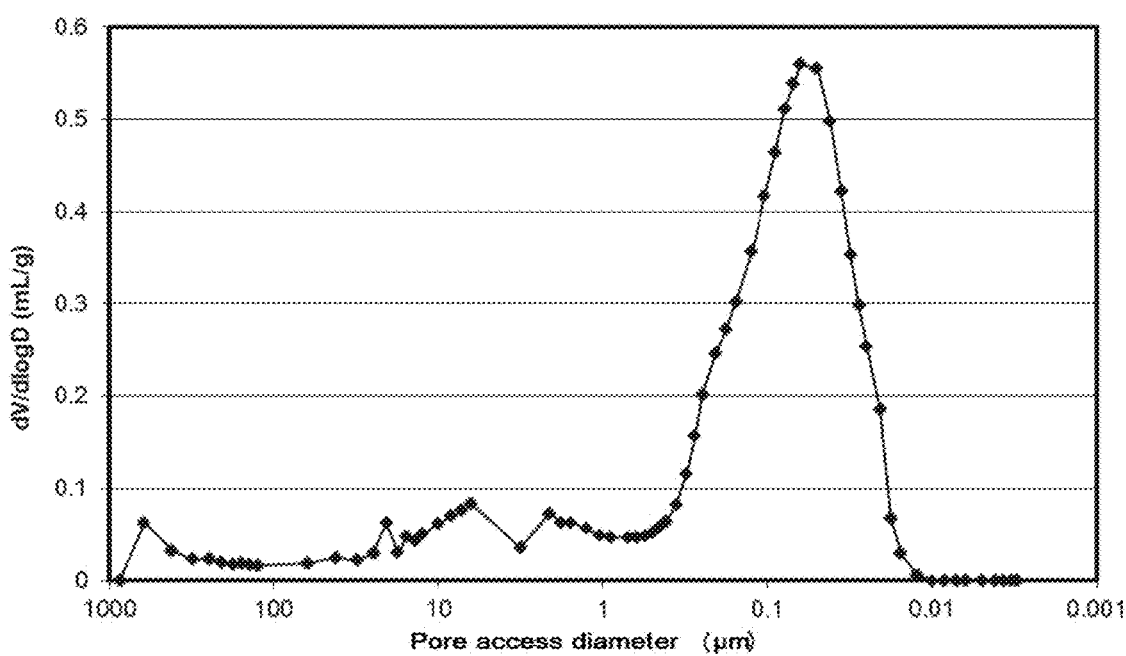
FIG. 4 shows the distribution of the pore sizes by mercury porosimetry of the geopolymer foam with 40% of organic liquid according to the present invention.

A distribution of the pore sizes by mercury porosimetry was achieved on the geopolymer foam with 40% of organic matrix, and a double macroporosity appears located between 1-10 μm and 0.1 μm (FIG. 4).

REFERENCES

[1] Calmon, 1980, "Explosion hazards of using nitric acid in ion-exchange equipment", Chemical Engineering, Vol. 87, pages 271-274.
[2] Pillay, 1986, "A review of the radiation stability of ion exchange materials", Journal of Radioanalytical and Nuclear Chemistry, Vol. 102, pages 247-268.
[3] Prud'homme et al, 2011, "In situ inorganic foams prepared from various clays at low temperature", Applied Clay Science, Vol. 51, pages 15-22.
[4] Medri et al, 2013, "Effect of metallic Si addition on polymerization degree of in situ foamed alkali-aluminosilicates", Ceramics International, Vol. 39, pages 7657-7668.
[5] Rickard and Van Riessen, 2013, "Performance of solid and cellular structured fly ash geopolymers exposed to a simulated fire", Cement and Concrete Composites.
[6] Strozi Cilla et al, 2014, "Geopolymerfoams by gelcasting", Ceramics International, Vol. 40, pages 5723-5730.

The invention claimed is:

1. A method for preparing a macroporous and mesoporous geopolymer comprising the successive steps consisting of:
   1) preparing a composite material comprising a geopolymer matrix and an organic liquid; and then
   2) removing said organic liquid by a treatment selected from the group consisting of at least one of a heat treatment, oxidation treatment, photodegradation treatment and an extraction via a supercritical fluid or ultrasounds,
   wherein said step (1) comprises the following sub-steps:
   a) preparing an activation solution comprising said organic liquid,
   b) adding to the solution obtained in step (a) at least one alumino-silicate source,
   c) subjecting the mixture obtained in step (b) to conditions allowing hardening of the geopolymer.

2. The method according to claim 1, wherein the composite material prepared during said step (1) appears as a geopolymer or a geopolymeric matrix in which beads of organic liquid and microbeads and/or nanobeads of organic liquid are coated.

3. The method according to claim 1, wherein said organic liquid comprises at most 50% of triglycerides by mass based on the total dry mass of said organic liquid.

4. The method according to claim 1, wherein said organic liquid is an unsaponifiable organic liquid.

5. The method according to claim 1, wherein said organic liquid comprises a thermally insulating oil.

6. The method according to claim 1, wherein said organic liquid comprises at least one element selected from the group consisting of a naphthenic oil; an aliphatic hydrocarbon; an unsaturated linear synthetic hydrocarbon; an aromatic hydrocarbon; a chlorinated linear hydrocarbon; a chlorinated aromatic hydrocarbon; a chlorinated-fluorinated linear hydrocarbon; an ethylenic aromatic hydrocarbon; a chlorinated solvent; an oxygenated solvent; an alkyl phosphate; an alkyl chloride and a liquid silicone.

7. The method according to claim 1, wherein said organic liquid comprises at least one element selected from the group consisting of commercial scintillator liquid, motor oil, oil for transformers, benzene, alkylbenzene, alkylnaphthalene, alkylbiphenyl, toluene, xylene, ethylbenzene, kerosene, hexane, cyclohexane, octane, ethylcyclohexane, dodecane, eicosane, phenol, dichloromethane, trichloroethane, dichlorobenzene, trichloroethylene, perchlorethylene, trichlorobenzene, polychlorobiphenyl, trichloro-trifluoroethane, alkyldiarylethylene, 2-octanone, 4-dodecanone, tributyl phosphate (TBP), tetrahydrofuran (THF), diethyl ether, polydimethylsiloxane and polydiphenylsiloxane.

8. The method according to claim 1, wherein surfactant(s) is(are) added (α) to said activation solution prior to the addition of said organic liquid, (β) to said organic liquid prior to its addition in said activation solution or (γ) to said activation solution into which the organic liquid has already been added.

9. The method according to claim 1, wherein in addition to the alumino-silicate source, sand, granulate and/or fines are added to the activation solution during said sub-step (b).

10. The method according to claim 1, wherein said heat treatment consists of subjecting the composite material of step (1) to a temperature above 200° C.

11. The method according to claim 1, wherein said oxidation treatment is either a plasma treatment or an ozone treatment.

12. The method according to claim 1, wherein said supercritical fluid is selected from the group consisting of at least one of supercritical carbon dioxide ($CO_2$), supercritical nitrogen monoxide ($N_2O$), supercritical chlorodifluoromethane, supercritical trifluoromethane, supercritical methanol, supercritical hexane and supercritical water.

13. The method according to claim 3, wherein said organic liquid comprises at most 40% of triglycerides by mass based on the total dry mass of said organic liquid.

14. The method according to claim 3, wherein said organic liquid comprises at most 30% of triglycerides by mass based on the total dry mass of said organic liquid.

15. The method according to claim 3, wherein said organic liquid comprises at most 20% of triglycerides by mass based on the total dry mass of said organic liquid.

16. The method according to claim 3, wherein said organic liquid comprises at most 10% of triglycerides by mass based on the total dry mass of said organic liquid.

17. The method according to claim 1, wherein said organic liquid is a thermally insulating oil.

18. The method according to claim 1, wherein said organic liquid is at least one element selected from the group consisting of a naphthenic oil; an aliphatic hydrocarbon; an unsaturated linear synthetic hydrocarbon; an aromatic hydrocarbon; a chlorinated linear hydrocarbon; a chlorinated aromatic hydrocarbon; a chlorinated-fluorinated linear hydrocarbon; an ethylenic aromatic hydrocarbon; a chlorinated solvent; an oxygenated solvent; an alkyl phosphate; an alkyl chloride and a liquid silicone.

19. The method according to claim 1, wherein said organic liquid is at least one element selected from the group consisting of commercial scintillator liquid, motor oil, oil for transformers, benzene, alkylbenzene, alkylnaphthalene, alkylbiphenyl, toluene, xylene, ethylbenzene, kerosene, hexane, cyclohexane, octane, ethylcyclohexane, dodecane, eicosane, phenol, dichloromethane, trichloroethane, dichlorobenzene, trichloroethylene, perchlorethylene, trichlorobenzene, polychlorobiphenyl, trichloro-trifluoroethane, alkyldiarylethylene, 2-octanone, 4-dodecanone, tributyl phosphate (TBP), tetrahydrofuran (THF), diethyl ether, polydimethylsiloxane and polydiphenylsiloxane.

20. The method according to claim 10, wherein said heat treatment consists of subjecting the composite material of step (1) to a temperature between 300° C. and 1,000° C.

21. The method according to claim 10, wherein said heat treatment consists of subjecting the composite material of step (1) to a temperature between 400° C. and 800° C.

22. The method according to claim 1, wherein said organic liquid comprises at least one element selected from the group consisting of an aromatic synthetic hydrocarbon, an alcohol, a ketone, a glycol ether and an ether oxide.

23. The method according to claim 1, wherein said organic liquid is at least one element selected from the group consisting of an aromatic synthetic hydrocarbon, an alcohol, a ketone, a glycol ether and an ether oxide.

* * * * *